US007512689B2

(12) United States Patent
Saint-Hilaire et al.

(10) Patent No.: US 7,512,689 B2
(45) Date of Patent: Mar. 31, 2009

(54) PLUG AND PLAY NETWORKING ARCHITECTURE WITH ENHANCED SCALABILITY AND RELIABILITY

(75) Inventors: Ylian Saint-Hilaire, Hillsboro, OR (US); Bryan Y. Roe, Camas, WA (US); Nelson F. Kidd, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 10/610,825

(22) Filed: Jul. 2, 2003

(65) Prior Publication Data

US 2005/0005013 A1 Jan. 6, 2005

(51) Int. Cl.
*G06F 15/16* (2006.01)
(52) U.S. Cl. .................. 709/227; 709/220; 709/221; 709/222; 709/235; 709/248; 709/250; 370/310
(58) Field of Classification Search ............ 709/227, 709/220–222, 235, 248, 250; 370/310
See application file for complete search history.

(56) References Cited

U.S. PATENT DOCUMENTS

| | | | | |
|---|---|---|---|---|
| 5,805,594 | A * | 9/1998 | Kotchey et al. | 370/401 |
| 6,259,916 | B1 * | 7/2001 | Bourk et al. | 455/434 |
| 6,411,608 | B2 * | 6/2002 | Sharony | 370/318 |
| 6,522,881 | B1 * | 2/2003 | Feder et al. | 455/437 |
| 6,580,700 | B1 * | 6/2003 | Pinard et al. | 370/332 |
| 6,606,482 | B1 * | 8/2003 | Wheeler | 455/11.1 |
| 6,717,926 | B1 * | 4/2004 | Deboille et al. | 370/330 |
| 6,779,004 | B1 * | 8/2004 | Zintel | 709/227 |
| 6,869,016 | B2 * | 3/2005 | Waxelbaum | 235/472.02 |
| 6,952,396 | B1 * | 10/2005 | Cottreau et al. | 370/222 |
| 6,959,335 | B1 * | 10/2005 | Hayball et al. | 709/227 |
| 7,039,032 | B1 * | 5/2006 | Ho et al. | 370/338 |
| 7,085,814 | B1 * | 8/2006 | Gandhi et al. | 709/208 |
| 7,089,298 | B2 * | 8/2006 | Nyman et al. | 709/220 |
| 7,181,521 | B2 * | 2/2007 | Knauerhase et al. | 709/224 |
| 7,248,570 | B2 * | 7/2007 | Bahl et al. | 370/329 |
| 7,418,486 | B2 * | 8/2008 | Brubacher et al. | 709/220 |
| 2001/0047387 | A1 * | 11/2001 | Brockhurst | 709/203 |
| 2002/0018451 | A1 * | 2/2002 | Sharony | 370/329 |
| 2002/0029256 | A1 * | 3/2002 | Zintel et al. | 709/218 |

(Continued)

OTHER PUBLICATIONS

Intel Technology Journal, "Interoperable Home Infrastructure" vol. 6, Nov. 15, 2002 XP-002300568.

(Continued)

*Primary Examiner*—Alina N. Boutah
(74) *Attorney, Agent, or Firm*—Kenneth J. Cool; Cool Patent, P.C.

(57) ABSTRACT

Systems and methods of discovering devices on a plug and play network provide for enhanced network performance. Initial discovery messages can be adapted based on predetermined characteristics of access points such as the access point being associated with a high loss connection to a network node and the access point being associated with a congested environment with regard to discovery traffic. In one approach, initial discovery messages are transmitted over a wireless connection in unicast so that error correction is implemented. Other approaches involve storing notification messages at access points to minimize discovery traffic, and transmitting initial discovery messages at the lowest available transmission rate to eliminate the need for the transmission of multiple copies.

23 Claims, 4 Drawing Sheets

U.S. PATENT DOCUMENTS

| | | | |
|---|---|---|---|
| 2002/0078161 A1* | 6/2002 | Cheng | 709/208 |
| 2002/0105968 A1* | 8/2002 | Pruzan et al. | 370/465 |
| 2002/0112058 A1* | 8/2002 | Weisman et al. | 709/227 |
| 2002/0119783 A1* | 8/2002 | Bourlas et al. | 455/453 |
| 2002/0164952 A1* | 11/2002 | Singhal et al. | 455/41 |
| 2003/0032433 A1* | 2/2003 | Daniel et al. | 455/452 |
| 2003/0112784 A1* | 6/2003 | Lohtia et al. | 370/342 |
| 2003/0119484 A1* | 6/2003 | Adachi et al. | 455/411 |
| 2003/0119527 A1* | 6/2003 | Labun et al. | 455/456 |
| 2003/0129988 A1* | 7/2003 | Lee et al. | 455/450 |
| 2003/0139197 A1* | 7/2003 | Kostic et al. | 455/525 |
| 2003/0140344 A1* | 7/2003 | Bhatti | 725/62 |
| 2004/0004968 A1* | 1/2004 | Nassar | 370/401 |
| 2004/0008627 A1* | 1/2004 | Garg et al. | 370/235 |
| 2004/0008652 A1* | 1/2004 | Tanzella et al. | 370/338 |
| 2004/0068668 A1* | 4/2004 | Lor et al. | 713/201 |
| 2004/0090929 A1* | 5/2004 | Laux et al. | 370/311 |
| 2004/0121749 A1* | 6/2004 | Cui et al. | 455/226.1 |
| 2004/0133704 A1* | 7/2004 | Krzyzanowski et al. | 709/250 |
| 2004/0193609 A1* | 9/2004 | Phan et al. | 707/10 |
| 2004/0210657 A1* | 10/2004 | Narayanan et al. | 709/227 |
| 2004/0225818 A1* | 11/2004 | Han | 710/305 |
| 2004/0249907 A1* | 12/2004 | Brubacher et al. | 709/220 |
| 2004/0255029 A1* | 12/2004 | Manion et al. | 709/227 |
| 2005/0220019 A1* | 10/2005 | Melpignano | 370/232 |

OTHER PUBLICATIONS

Khedr, "Acan-Ad Hoc Context Aware Network" Online! 2002 XP002300569 Retrieved from the Internet: www.site.uottawa.ca/{mkhedr/ccecefinal.pdf> on Oct. 13, 2004.

Microsodt Corporation, "Universal Plug and Play Device Architecture" Version 1.0 Protocols, Jun. 8, 2000, XP002210614.

International Search Report dated Oct. 27, 2004.

Walker, M.R., et al., "Remote I/O: Freeing the Experience from the Platform with UPnP* Architecture", Intel Technology Journal, 6, 2002, pp. 30-35.

Wenjian, X., et al., "Application of UPnP for FW/NAT Traverse in Multimedia Communcation System", Telecommunication Science, Analysis and Research of Charging Capability of Parlay API, 2004, 5 pgs.

* cited by examiner

PLUG AND PLAY NETWORKING ARCHITECTURE WITH ENHANCED SCALABILITY AND RELIABILITY

BACKGROUND

1. Technical Field

Embodiments of the present invention generally relate to network communications. More particularly, embodiments relate to plug and play networking.

2. Discussion

As computers continue to grow in popularity, the demand for enhanced functionality also grows. For example, plug-and-play (PnP) functionality, which facilitates the connection of peripheral devices to computing platforms, is in high demand. In fact, recent efforts have been made to expand PnP functionality to encompass the addition of devices to a network. For example, the UPnP Forum is a group of industry participants that has undertaken the development of zero-configuration, "invisible" networking, and automatic discovery for a breadth of device categories from a wide range of vendors.

A conventional PnP networking architecture includes network nodes such as devices and control points, and the backbone components that interconnect the nodes. A device in a PnP network provides services such as printing and playing compact disks (CDs), whereas a control point is a controller capable of discovering and controlling devices. A network node can therefore function as either a device, a control point, or both, where each network node typically connects to the network via an access point such as a standalone gateway or a personal computer (PC) acting as gateway. When a node either announces its presence on the network (as a device) or launches a search for previously unidentified devices (as a control point), an initial discovery message is generated and is transmitted to the appropriate PnP access point in a multicast format. The initial discovery message is transmitted in multicast because the appropriate recipients have not yet been "discovered" by the originator. The access point receives the initial discovery message and multicasts it to the other devices/control points on the network. In the case of an initial discovery message that defines a notification message from a device, the notification message is multicast to the control points on the network. As a result, the network control points can determine whether the device offers services of interest. In the case of the initial discovery message defining a search message from a control point, the search message is multicast to the devices on the network.

Generally, initial discovery messages are not adapted based on the characteristics of the access node. As a result, optimum network performance is difficult to achieve under certain circumstances. For example, if the access node is associated with a high loss connection to the network node, conventional systems do not provide for adapting the initial discovery message to account for reliability concerns. Rather, it is common practice to merely transmit multiple copies of the initial discovery message regardless of whether the access point is associated with a high loss connection. Indeed, typical initial discovery messages (as well as other PnP networking messages) use the simple service discovery protocol (SSDP, Version 1.0, Internet Engineering Task Force/IETF, October 1999), which is built on top of the user datagram protocol (UDP, State Transition Diagram/STD 6, RFC 768, August 1980). UDP is a communications protocol that does not provide for error correction of initial discovery messages at the data link layer (i.e., Layer 2 of the Open Systems Interconnect/OSI model). Unfortunately, certain types of connections, such as wireless and dial-up connections, can have losses on the order of 20-30% packet loss. As a result, the transmission of multiple copies can be ineffective. Although certain approaches provide for reducing the data transmission rate once the data loss has reached a predetermined threshold (e.g., 20%), data transmitted before the reduction may still be lost. This is especially true for discovery transmissions, which occur relatively early in the PnP networking process. There is therefore a need for an approach that provides for adaptation of initial discovery messages based on a predetermined characteristic of an access point such as the access node being associated with a high loss connection to network nodes.

Furthermore, if the access point is associated with a high discovery traffic environment, conventional systems do not provide for adapting the initial discovery message to account for scalability concerns. For example, if an access point is deployed in a wireless corporate network environment in which devices and control points connect to and disconnect from the network frequently, the initial discovery messages are not adapted based on this characteristic. Indeed, most approaches contribute to network congestion by transmitting multiple copies of the initial discovery message as already discussed. In addition, reducing the transmission rate in response to the data loss threshold being exceeded typically does not benefit discovery traffic because it occurs too soon. There is therefore a need for an approach that provides for adaptation of initial discovery messages based on a predetermined characteristic of an access point such as the access point being associated with a high discovery traffic environment.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the invention provide for enhanced scalability and reliability by providing for initial discovery messages that are adapted based on a predetermined characteristic of the receiving access point. By adapting initial discovery messages based on the characteristics of the receiving access point, optimum network performance can be achieved. Adaptation of initial discovery messages can be implemented in a number of difference ways depending upon the circumstances.

Figure 1:
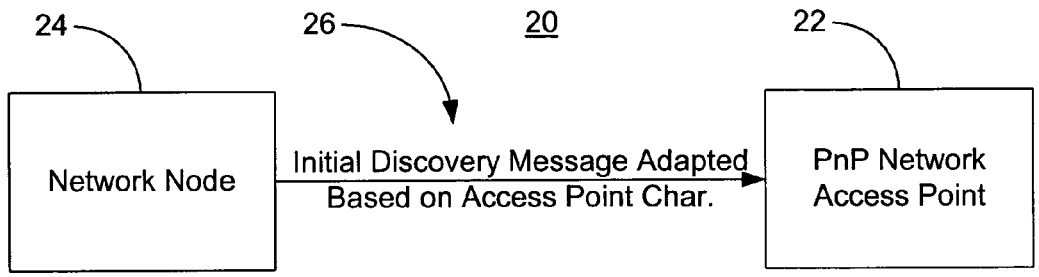
FIG. 1 is a block diagram of an example of a discovery link between a network access point and a network node according to one embodiment of the invention.

FIG. 1 shows a networking architecture 20 in which a PnP network access point 22 is configured to receive an initial discovery message 26 from a network node 24. The type of connection between access point 22 and node 24 can include WiFi (Institute of Electrical and Electronics Engineers/IEEE 801.11a and 801.11b Wireless), power line network, phone line and firewire (IEEE 1394), among others. The access point 22 may also connect to other network nodes (not shown) using a wide variety of local area network (LAN) media. In addition to bridging the node 24 to the PnP network, services provided by the access point 22 might include Internet access. The access point 22 may also function as a dynamic host configuration protocol (DHCP, Request for Comments/RFC 2131, March 1997) server, a domain name system (DNS) proxy, a storage device, etc. The initial discovery message 26 is adapted based on a predetermined characteristic of the access point 22 and enables improved network performance with regard to parameters such as scalability and reliability.

While certain examples will be described with regard to wireless connections between access points and network nodes, it should be noted that the embodiments of the invention are not so limited. Indeed, the principles discussed herein can be useful in any networking environment in which performance parameters such as scalability and reliability are issues of concern. Notwithstanding, there are a number of aspects of wireless networking for which the illustrated embodiments are well suited.

Figure 3:
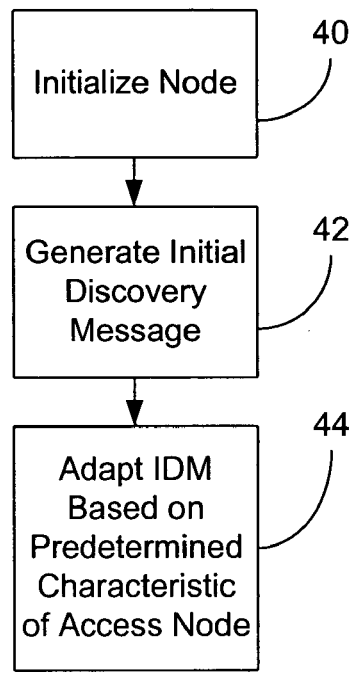
FIG. 3 is a flowchart of an example of a method of communicating discovery information to an access point of a plug and play network according to one embodiment of the invention.

Turning now to FIG. 3, a method 38 of communicating discovery information to an access point of a PnP network is shown. Method 38 can be implemented in a network node 24 (FIG. 1) using any number of commercially available hardware and/or software programming techniques. For example, method 30 can be implemented in an article of manufacture which includes a machine-readable medium such as readonly memory (ROM), random access memory (RAM), magnetic disk, etc., which includes a set of stored instructions capable of being executed by a processor. Generally, method 38 provides for initializing the network node at processing block 40. Initialization can involve obtaining the necessary address information for the node to participate on the network. For example, under the UPnP protocol, each device has a DHCP client, where the device searches for a DHCP server when the device is first connected to the network. If a DHCP server is available, the device uses the Internet protocol (IP) address assigned to the server. If no DHCP server is available, the device uses Auto-IP (Automatically choosing an IP Address in an Ad-Hoc IPv4Network, IETF draft, April, 1999), which defines how a device intelligently chooses an IP address from a set of reserved private addresses. Block 42 provides for generating an initial discovery message for the network node and block 44 provides for adapting the initial discovery message based on a predetermined characteristic of the access node. Examples of such predetermined characteristics include, but are not limited to, the access point being associated with a high loss connection to the network node and the access point being associated with a congested environment with regard to discovery traffic.

Figure 4:
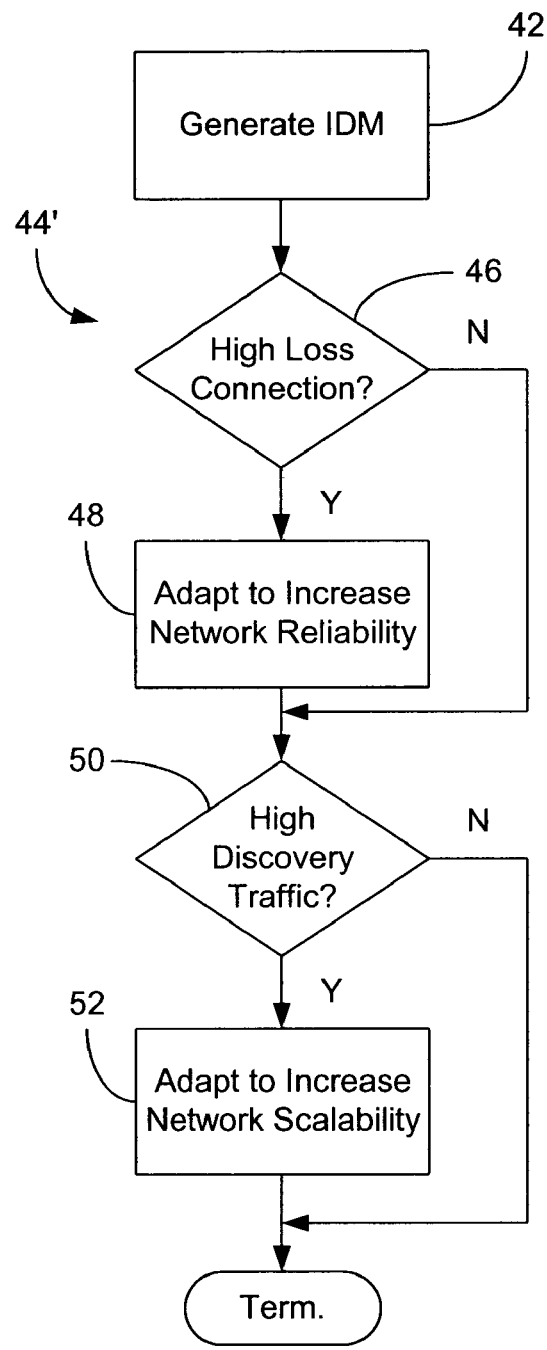
FIG. 4 is a flowchart of an example of a process of adapting an initial discovery message to improve network performance according to one embodiment of the invention.

FIG. 4 shows an approach to adapting an initial discovery message in greater detail at block 44'. Specifically, if it is determined at block 46 that the access point is associated with a high loss connection to the network node, block 48 provides for adapting the initial discovery message to increase network reliability. If it is determined at block 50 that the access point is associated with a congested environment with regard to discovery traffic, block 52 provides for adapting the initial discovery message to increase network scalability. Thus, the initial discovery message, whether a notification message from a device or a search message from a control point, can be "customized" with regard to the specific characteristics of the access point receiving the initial discovery message. It should be noted that the determinations at blocks 46 and 50 can be made "offline" based on the anticipated configuration of the network. For example, if the connection between the node and the access point is to be either a wireless or a dial-up connection, the access point can be identified as being associated with a high loss connection because these types of connections are known to have packet losses on the order of 20% or more. Furthermore, if the access point is expected to be used in an environment such as a corporate site, college campus or airport, the access point can be identified as being associated with a congested environment with regard to discovery traffic because these types of environments are known to have devices and control points that frequently connect to and disconnect from the network.

Figure 5:
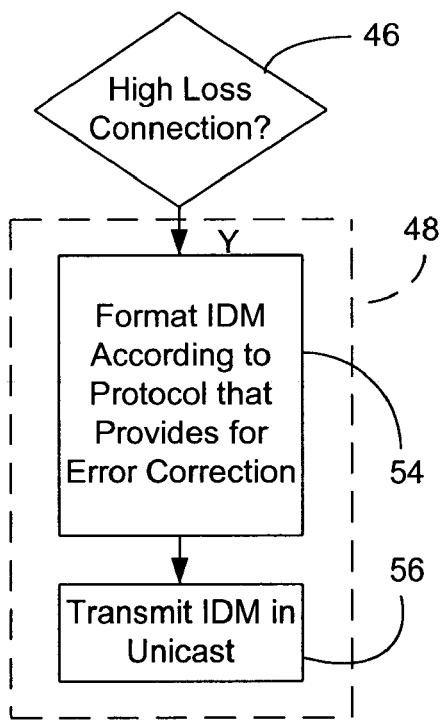
FIG. 5 is a flowchart of an example of a process of adapting an initial discovery message to increase network reliability according to one embodiment of the invention.

One approach to adapting an initial discovery message to increase network reliability is shown in FIG. 5 at block 48'. Specifically, the initial discovery message is formatted at block 54 according to a protocol that provides for error correction of unicast messages. One such protocol is the IEEE 802.11a, 802.11b wireless protocol, which provides for checking and resending of unicast packets at layer 2 of the OSI model. Since multicast packets are not checked for errors, block 56 provides for transmitting the initial discovery message toward the access point over the high loss connection in unicast.

Figure 6:
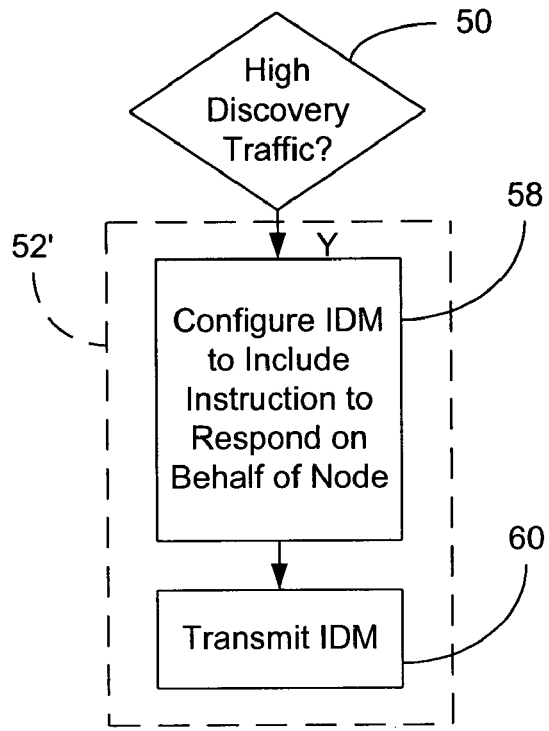
FIG. 6 is a flowchart of an example of a process of adapting an initial discovery message to increase network scalability according to one embodiment of the invention.

FIG. 6 shows one approach to adapting an initial discovery message to increase network scalability in greater detail at block 52'. Specifically, block 58 provides for configuring the initial discovery message as a notification message that includes an instruction for the access point to respond to search messages on behalf of a device, where the notification message enables the device to announce a presence of the device on the network. The notification message is transmitted toward the access point at block 60. The access point can therefore multicast the notification message to the control points that are currently connected to the network and store the notification message for control points that are subsequently added to the network. When the access point receives a search message from one of these control points, the access point can respond in unicast with the stored notification message. Thus, the approach shown in block 52' increases network scalability by reducing the amount of traffic between the device and the access point because subsequent search messages do not need to be sent all the way to the device. Such an approach is particularly useful when the access point must support discovery of a large number of nodes (i.e., in a congested environment with regard to discovery traffic).

Figure 7:
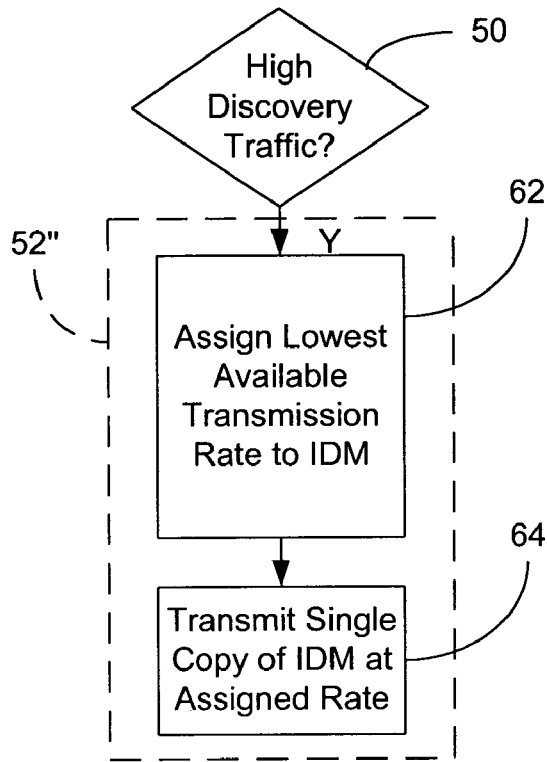
FIG. 7 is a flowchart of an example of a process of a process of adapting an initial discovery to increase network scalability according to an alternative embodiment of the invention.

Turning now to FIG. 7, another approach to adapting an initial discovery message to increase network scalability is shown at block 52" in greater detail. Specifically, a lowest available transmission rate is assigned to the initial discovery message at block 62. For example, in a wireless system having transmission rates of 11 MB/sec, 5.5 MB/sec, 2.5 MB/sec and 1 MB/sec, the 1 MB/sec rate could be assigned. Block 64 provides for transmitting a single copy of the initial discovery message toward the access point at the lowest available transmission rate. Transmitting a single copy of the initial discovery message reduces the amount of discovery traffic between the node and the access point, and transmitting the initial discovery message at the lowest available transmission rate offsets the potential data loss associated with sending a single copy of initial discovery message.

Figure 8:
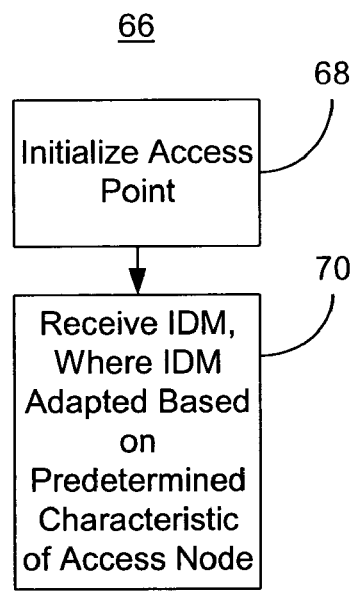
FIG. 8 is a flowchart of an example of a method of supporting discovery information over and plug and play network according to one embodiment of the invention.

Turning now to FIG. 8, a method 66 of supporting discovery communication over a PnP network is shown. Method 66 can be implemented in an access point 22 (FIG. 1) to improve network performance. Method 66 can implemented using any commercially available hardware and/or software programming techniques. For example, method 66 could be implemented as a machine readable medium such as ROM, RAM, magnetic disc, etc., which includes a set of stored instructions capable of being executed by a processor. Processing block 68 provides for initializing an access point. Initialization may include choosing an address for the access point as already discussed. An initial discovery message is received from a network node at block 70, where the initial discovery message is adapted based on a predetermined characteristic of the access point.

Figure 9:
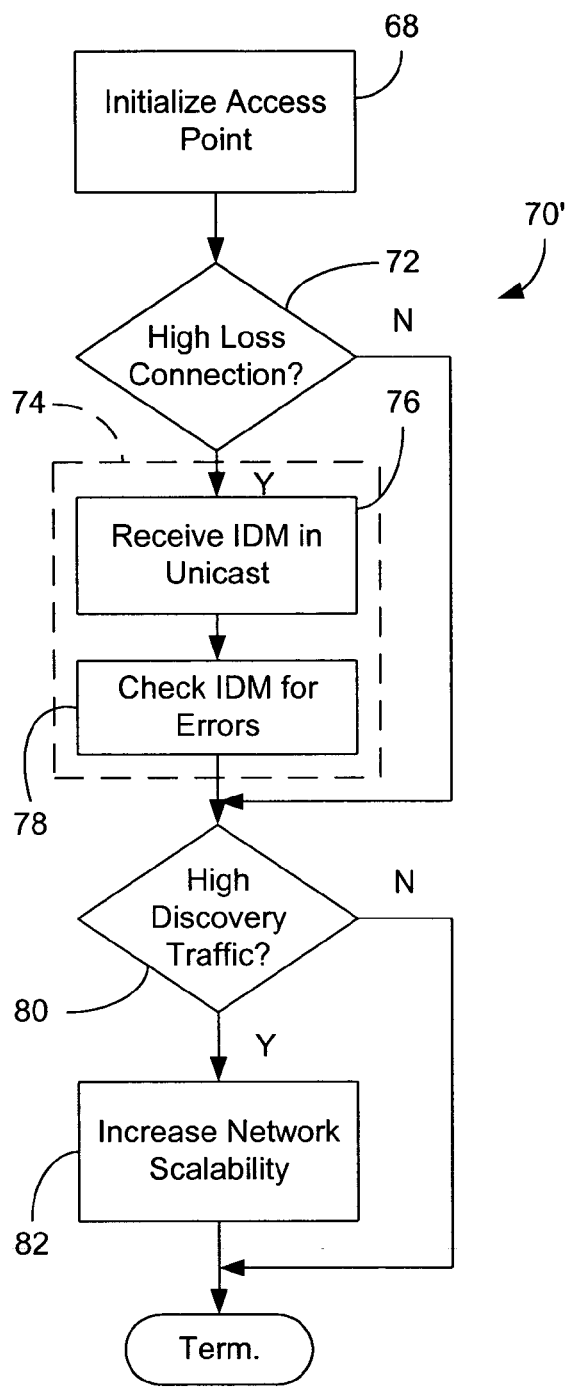
FIG. 9 is a flowchart of an example of a process of receiving an initial discovery message according to one embodiment of the invention.

FIG. 9 shows one approach to receiving an initial discovery message at block 70' in greater detail. Specifically, if it is determined at block 72 that the access point is associated with a high loss connection to the network node, the access point increases network reliability at block 74 by receiving the initial discovery message in unicast at block 76 and checking the initial discovery message for errors at block 78. In this regard, the initial discovery message has been formatted according to a protocol that provides for error correction of unicast messages. One example of such a protocol is the IEEE 802.11a, 802.11b wireless protocol, although others may be available. Checking the initial discovery message for errors according to the protocol at block 78 therefore represents a significant departure from the conventional technique of receiving multiple copies of multicasted initial discovery messages in order to improve reliability. If it is determined at block 80 that the access point is associated with a congested environment with regard to discovery traffic, the access point increases network scalability at block 82. The determinations at blocks 72 and 80 can be made offline based on the expected deployment of the access point, or online based on the condition of the received initial discovery message.

Figure 10:
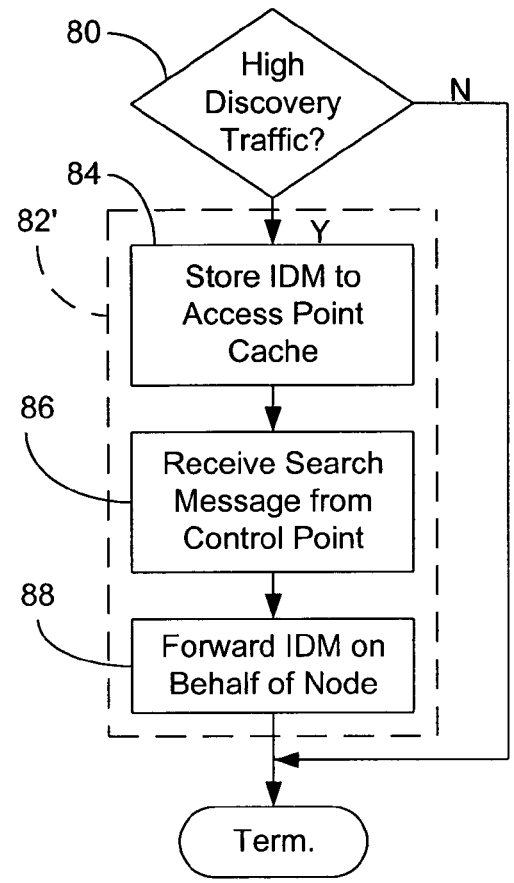
FIG. 10 is a flowchart of an example of receiving an initial discovery message in a high discovery traffic environment according to one embodiment of the invention.
Figure 11:
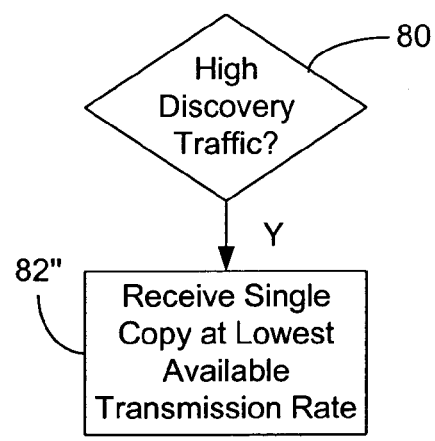
FIG. 11 is a flowchart of an example of a process of receiving an initial discovery message in a high discovery traffic environment according to an alternative embodiment of the invention.

FIG. 10 shows one approach to increasing network scalability at block 82' in greater detail. Specifically, block 84 provides for storing the initial discovery message to an internal cache of the access point as a notification message. As already discussed, notification messages enable devices to announce their presence on the network. A search message is received from a network control point at block 86 and the notification message is forwarded toward the control in unicast format at block 88 in response to the search message on behalf of the device. Thus, the search message does not need to be sent to the device. Such an approach reduces the amount of discovery traffic and increases network scalability. FIG. 11 shows an alternative approach to increasing network stability in which a single copy of the initial discovery message is received at the lowest available transmission rate at block 82".

Figure 2:
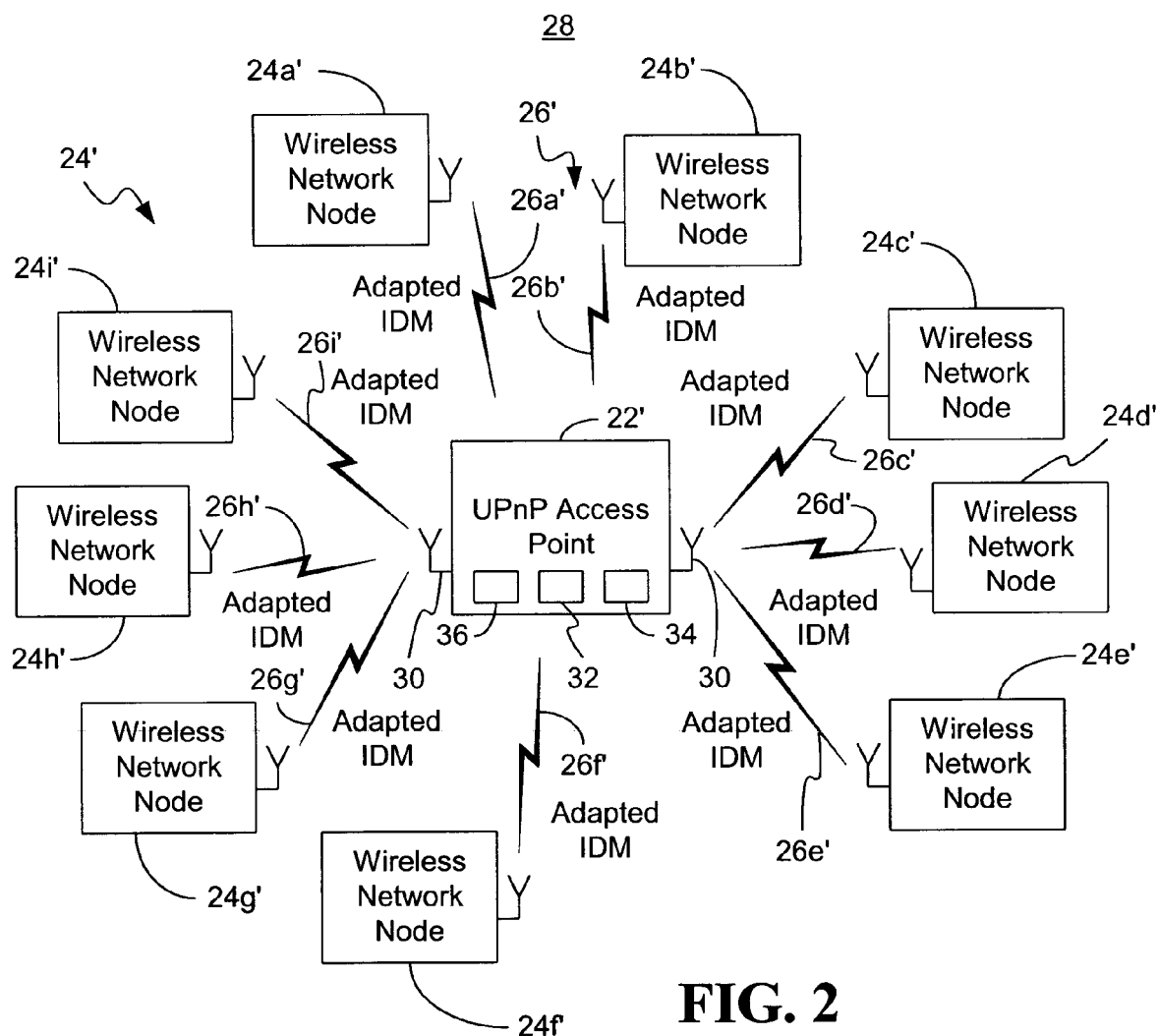
FIG. 2 is a block diagram of an example of an access point having high loss connections to network nodes and a high discovery traffic environment according to one embodiment of the invention.

FIG. 2 shows an architecture 28 in which a PnP access point 22' is associated with a number of high loss connections to network nodes 24' (24a'-24i') and a congested environment with regard to discovery traffic. Specifically, the high loss connections are wireless connections operating under a protocol such as the IEEE 801.11 a and 801.11b wireless protocols. The nodes 24' may be either devices, control points or both, depending on the configuration of the particular node. In this regard, access point 22' may have one or more antennas 30, a processor 32 and a machine-readable medium operatively coupled to the antennas 30 and the processor 32. Medium 34 can be any acceptable medium such as read only memory (ROM), random access memory (RAM), magnetic desk, etc., which includes a set of stored instructions capable of being executed by the processor 32. The instructions can be executed to initialize the access point 22' and receive initial discovery messages 26' (26a'-26i'), where the initial discovery messages 26' are adapted based on a characteristic of the access point 22'.

As will be discussed in greater detail below, the access point 22' may also include an internal cache 36, where the instructions stored in medium 34 are further capable of being executed to store one or more of the initial discovery messages 26' to the internal cache 36 as notification messages. Notification messages enable nodes to announce their presence on the network. When a search message is received from a network control point, the access point 22' can retrieve the notification message from the internal cache 36 and forward it toward the control point in unicast format on behalf of the device that originated the notification message. This approach enables the access point 22' to improve scalability because the search message does not have to be sent over the wireless link and the notification message can be sent in unicast format as opposed to multicast format. Simply put, the amount of traffic over the wireless connections as well as the rest of the PnP network can be reduced in order to enhance scalability.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of communicating discovery information, comprising:

initializing a plug and play network device by obtaining an address for the plug and play network device;

generating a notification message for the plug and play network device, the notification message enabling the device to announce a presence of the plug and play network device on the network;

adapting the notification message to increase network reliability based on an access point of the network being associated with a wireless connection to the plug and play network device by formatting the notification message according to a protocol that provides for error correction of unicast messages and transmitting a single copy of the notification message toward the access point over the wireless connection in unicast; and adapting the notification message to increase network scalability based on the access point being associated with a congested environment with regard to discovery traffic by configuring the notification message to include an instruction for the access point to respond to search messages on behalf of the plug and play network device.

2. The method of claim 1, wherein the congested environment includes a corporate networking environment.

3. The method of claim 1, further including adapting the notification message based on the access point being associated with a high loss connection to the plug and play network device.

4. The method of claim 3, further including:
formatting the notification message according to a protocol that provides for error correction of unicast messages; and
transmitting the notification message toward the access point over the high loss connection in unicast.

5. The method of claim 4, wherein the high loss connection is a wireless connection.

6. The method of claim 4, wherein the high loss connection is a dial-up connection.

7. The method of claim 1, further including adapting the notification message based on the access point being associated with a high discovery traffic environment with regard to discovery traffic.

8. The method of claim 7, further including:
configuring the notification message to include an instruction for the access point to respond to search messages on behalf of a device, the notification message enabling the device to announce a presence of the device on the plug and play network; and
transmitting the notification message toward the access point.

9. The method of claim 7, further including:
assigning a lowest available transmission rate to the notification message; and
transmitting the notification message toward the access point at the lowest available transmission rate.

10. The method of claim 9, further including transmitting a single copy of the notification message toward the access point.

11. The method of claim 7, wherein the high discovery traffic environment includes a corporate networking environment.

12. An article of manufacture having instructions stored thereon that, if executed, result in:
initializing a plug and play network device by obtaining an address for the plug and play network device;
generating a notification message for the plug and play network device, the notification message enabling the device to announce a presence of the plug and play network device on the network;
adapting the notification message to increase network reliability based on an access point of the network being associated with a wireless connection to the plug and play network device by formatting the notification message according to a protocol that provides for error correction of unicast messages and transmitting a single copy of the notification message toward the access point over the wireless connection in unicast; and
adapting the notification message to increase network scalability based on the access point being associated with a congested environment with regard to discovery traffic by configuring the notification message to include an instruction for the access point to respond to search messages on behalf of the plug and play network device.

13. The article of manufacture of claim 12, wherein the congested environment includes a corporate networking environment.

14. The article of manufacture of claim 12, wherein the instructions, if executed, further result in:
adapting the notification message based on the access point being associated with a high loss connection to the plug and play network device.

15. The article of manufacture of claim 14, wherein the instructions, if executed, further result in:
formatting the notification message according to a protocol that provides for error correction of unicast messages; and
transmitting the notification message toward the access point over the high loss connection in unicast.

16. The article of manufacture of claim 15, wherein the high loss connection is a wireless connection.

17. The article of manufacture of claim 15, wherein the high loss connection is a dial-up connection.

18. The article of manufacture of claim 12, wherein the instructions, if executed, further result in:
adapting the notification message based on the access point being associated with a high discovery traffic environment with regard to discovery traffic.

19. The article of manufacture of claim 18, wherein the instructions, if executed, further result in:
configuring the notification message to include an instruction for the access point to respond to search messages on behalf of a device, the notification message enabling the device to announce a presence of the device on the plug and play network; and
transmitting the notification message toward the access point.

20. The article of manufacture of claim 18, wherein the instructions, if executed, further result in:
assigning a lowest available transmission rate to the notification message; and
transmitting the notification message toward the access point at the lowest available transmission rate.

21. The article of manufacture of claim 20, wherein the instructions, if executed, further result in:
transmitting a single copy of the notification message toward the access point.

22. The article of manufacture of claim 18, wherein the high discovery traffic environment includes a corporate networking environment.

23. The article of manufacture of claim 12, wherein the instructions, if executed, further result in:
obtaining an address for the plug and play network device.

* * * * *